(12) United States Patent
Rempel et al.

(10) Patent No.: US 8,135,230 B2
(45) Date of Patent: *Mar. 13, 2012

(54) ENHANCING DYNAMIC RANGES OF IMAGES

(75) Inventors: Allan G. Rempel, Richmond (CA); Wolfgang Heidrich, Vancouver (CA); Helge Seetzen, Vancouver (CA); Gregory John Ward, Albany (CA); Lorne A. Whitehead, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 859 days.

This patent is subject to a terminal disclaimer.

(21) Appl. No.: 12/182,121

(22) Filed: Jul. 29, 2008

(65) Prior Publication Data

US 2009/0034867 A1 Feb. 5, 2009

Related U.S. Application Data

(60) Provisional application No. 60/962,708, filed on Jul. 30, 2007.

(51) Int. Cl.
*G06K 9/40* (2006.01)
(52) U.S. Cl. .......... 382/264; 382/260; 382/274
(58) Field of Classification Search .......... 382/169, 382/173, 232, 260–270, 274–275, 283, 299, 382/254; 345/63, 611, 626, 660, 687, 690; 348/235, 241, 252, 533; 353/31; 375/240.19, 375/254
See application file for complete search history.

(56) References Cited

U.S. PATENT DOCUMENTS

| | | | | |
|---|---|---|---|---|
| 5,799,111 A * | 8/1998 | Guissin | ........................ | 382/254 |
| 7,164,397 B2 * | 1/2007 | Pettitt et al. | ...................... | 345/63 |
| 7,224,411 B2 * | 5/2007 | Gibbon et al. | ................ | 348/757 |
| 7,265,784 B1 * | 9/2007 | Frank | ............................ | 348/241 |
| 7,280,705 B1 * | 10/2007 | Frank et al. | ................... | 382/274 |
| 7,404,645 B2 * | 7/2008 | Margulis | ........................ | 353/31 |
| 7,483,058 B1 * | 1/2009 | Frank et al. | ................ | 348/222.1 |
| 7,518,802 B2 * | 4/2009 | Kojima | .......................... | 359/634 |
| 7,768,496 B2 * | 8/2010 | Daly | ............................ | 345/102 |
| 2002/0118883 A1 * | 8/2002 | Bhatt | ............................ | 382/224 |
| 2005/0248592 A1 * | 11/2005 | Feng et al. | ................... | 345/690 |

FOREIGN PATENT DOCUMENTS

| | | |
|---|---|---|
| EP | 1648155 A2 | 4/2006 |
| JP | H06-253147 | 9/1994 |
| JP | 2001-134226 | 5/2001 |
| JP | 2003-290170 | 10/2003 |
| WO | WO2005/101309 A1 | 10/2005 |
| WO | WO2006/010244 A1 | 2/2006 |

OTHER PUBLICATIONS

Rempel, Allan G., "Ldr2Hdr", ACM Transactions on Graphics, vol. 26, No. 3, Jul. 29, 2007.
Seetzen, H. et al., "High dynamic range display systems", Proceedings ACM Siggraph, Dec. 9, 2004.

* cited by examiner

Primary Examiner — Kanjibhai Patel

(57) ABSTRACT

Methods and apparatus according to various aspects take as input image data in a lower-dynamic-range (LDR) format and produce as output enhanced image data having a dynamic range greater than that of the input image data (i.e. higher-dynamic range (HDR) image data). In some embodiments, the methods are applied to video data and are performed in real-time (i.e. processing of video frames to enhance the dynamic range of the video frames is completed at least on average at the frame rate of the video signal).

20 Claims, 12 Drawing Sheets

ENHANCING DYNAMIC RANGES OF IMAGES

CROSS-REFERENCE TO RELATED APPLICATION

This application claims priority from U.S. patent application No. 60/962,708 filed 30 Jul. 2007 and entitled ENHANCING DYNAMIC RANGES OF IMAGES. This application claims the benefit under 35 U.S.C. §119 of U.S. patent application No. 60/962,708 filed 30 Jul. 2007 and entitled ENHANCING DYNAMIC RANGES OF IMAGES which is hereby incorporated herein by reference.

TECHNICAL FIELD

This invention relates to digital imaging. The invention relates specifically to apparatus and methods for enhancing the dynamic range of images (images includes both still and video images). The invention may be embodied, without limitation, in electronic displays, media players (such as DVD players), image-processing sub-systems for use in electronic displays and/or media players and computer software provided on a medium which can be read and subsequently executed by a data processor.

BACKGROUND

The human eye is sensitive to light over a very wide range of intensities. Images must have high dynamic ranges to accurately reproduce real scenes. High-performance image sensors, such as high-performance CCD arrays are capable of acquiring images having high dynamic ranges. New generations of display devices promise to provide significantly improved dynamic range over conventional display technology.

Most existing movies, videos, and still images are recorded in formats that provide a dynamic range that is significantly lower than these new generations of display devices can produce. In the future, evolving camera technology and file formats will provide high fidelity content for these display devices. In the near term it would be desirable to provide a way to enhance the dynamic range of lower-dynamic-range media. This would permit viewers to enjoy at least some of the benefits of high-dynamic-range displays while enjoying existing media.

Viewers of theater imaging systems (projectors) and home-theater systems can be very discerning. In such applications, it is important to provide images that are substantially free from noticeable artifacts.

In some applications it would be desirable to produce an enhanced signal in real-time.

SUMMARY OF THE INVENTION

This invention has a number of aspects. One aspect provides methods which take as input image data in a lower-dynamic-range format and produce as output enhanced image data having a dynamic range greater than that of the input image data. In some embodiments, the methods are applied to video data and are performed in real-time (i.e. processing of video frames to enhance the dynamic range of the video frames is completed at least on average at the frame rate of the video signal).

Further aspects of the invention and features of specific embodiments of the invention are described below.

BRIEF DESCRIPTION OF THE DRAWINGS

The accompanying drawings illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
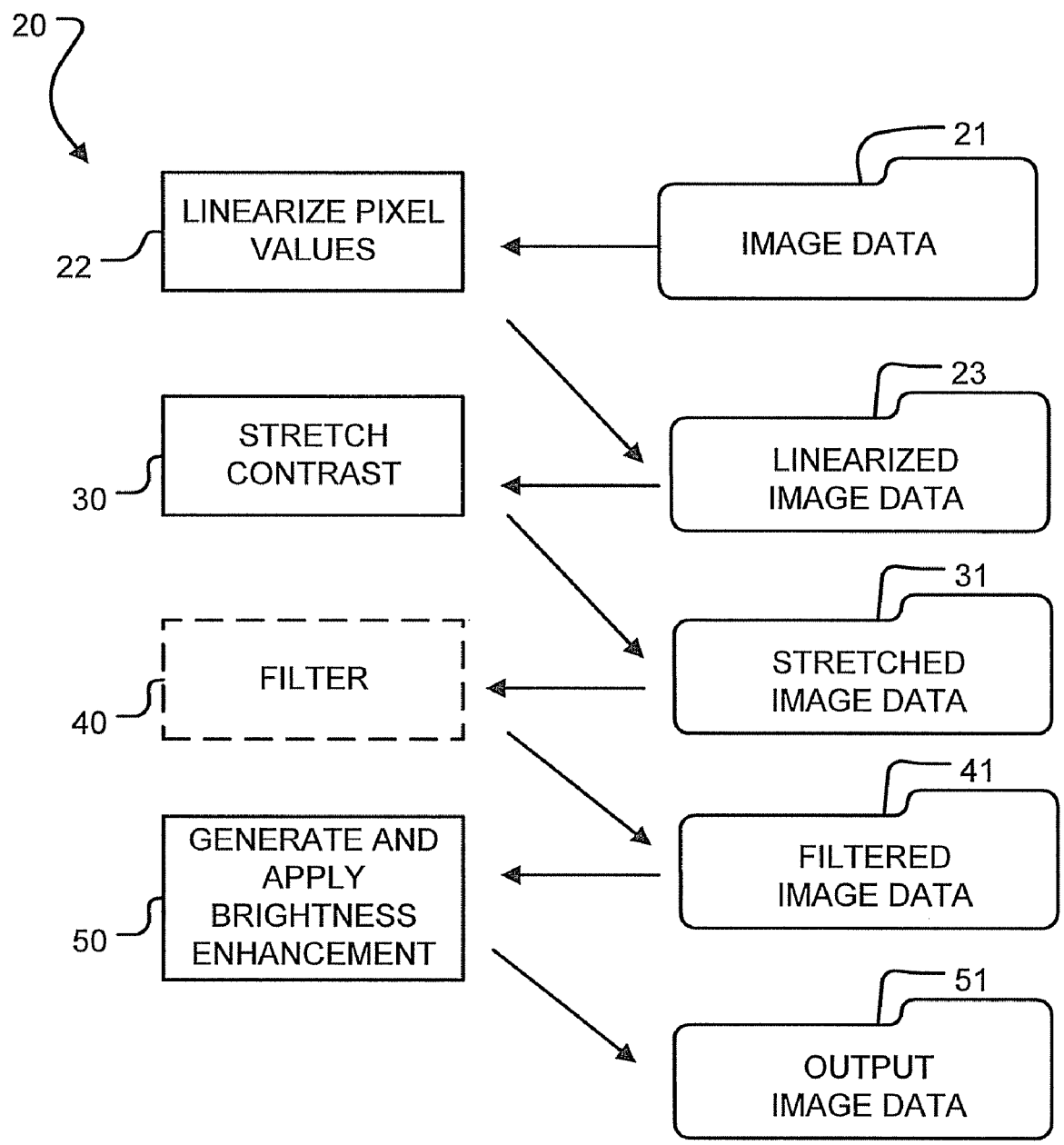
FIG. 1 is a flow diagram of a method for enhancing the dynamic range of an image according to one embodiment of the invention.

FIG. 1 is a flow chart illustrating a method 20 for enhancing dynamic range of a digital image defined by image data 21 according to one embodiment of the invention. In block 22, pixel values from image data 21 are linearized. Block 22 is not required in the case that the pixel values in image data 21 are already represented in a space in which luminance varies linearly with pixel value. In some cases block 22 can be avoided at the expense of additional down-stream processing. The output from block 22 is a linearized image data 23. Each pixel in linearized image data 23 has a value or values directly proportional to the luminance of the pixel.

The particular processing performed in block 20 will depend upon the encoding of the image in image data 21. For example, typical image and television data is encoded with a gamma curve having a gamma value of 2.2. This gamma curve is intended to compensate for non-linearities in conventional display technologies such as cathode ray tubes (CRTs). Linearization of such data can be achieved by applying a function that inverts the gamma curve. Inverting the gamma curve provides pixel values that are approximately proportional to the luminance in the original scene.

The linearization function may be implemented as a lookup table which looks up a pixel value for image data 21 and retrieves a corresponding linearized pixel value which can be written to linearized image data 23. In the alternative, the linearization function may be implemented by way of hardware or software executing on a suitable data processor that takes as input pixel values from image data 21 and produces as output corresponding linearized pixel values for linearized image data 23.

In some embodiments, block 22 comprises selecting one of a plurality of linearization functions that is most appropriate for linearizing image data 21. Some data formats include information that specifically or implicitly identifies a non-linear relationship between pixel values and luminance. Such information may be found in a header associated with the image data, for example.

Figure 1A:
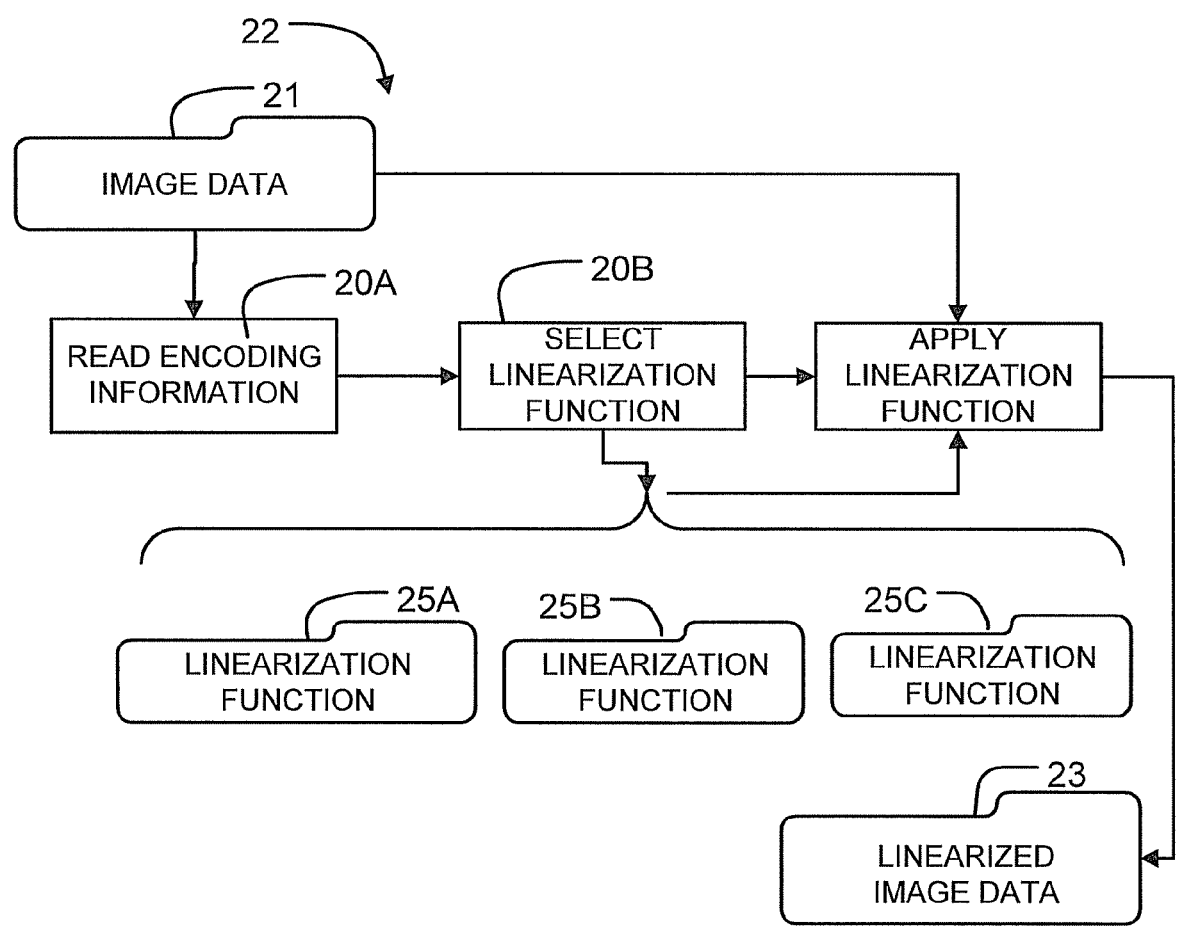
FIG. 1A is a flow diagram of a method for linearizing input image data according to one example embodiment.

FIG. 1A shows steps in a method according to a specific implementation Where image data 21 includes such encoding information that explicitly or implicitly identifies the relationship between pixel values in image data 21 and intended luminance then block 22 may comprise reading the encoding information (block 20A) selecting one of a plurality of linearization functions 25 (identified individually as 25A, 25B, 25C ... ) that matches the encoding information (block 20B) and applying the selected linearization 25 (block 20C).

In some embodiments, the pixel values in linearized image data 23 are absolute output intensities to be displayed on a display for the corresponding pixels.

In block 30 (FIG. 1) the contrast of linearized image data 23 is stretched to produce stretched image data 31. This may be performed in a variety of ways. In one embodiment, the stretching is performed according to:

$$HDR_{ij} = \alpha + \beta \times LDR_{ij} \quad (1)$$

where $LDR_{ij}$ is a pixel value from linearized image data 23, $HDR_{ij}$ is the corresponding pixel value from stretched image data 31; $\alpha$ is a parameter that may be set equal to the black level of the display on which the image will be displayed; and $\beta$ is a scaling factor. In some embodiments, $\alpha$ is less than 1 cd/m². In an example embodiment, $\beta$ is in the range of 0.05 to 0.6 cd/m². In a specific example embodiment, $\beta$ is 0.3 cd/m², which provides a deep black under normal viewing conditions. $\beta$ is chosen to produce a desired contrast ratio that is not so high that the resulting image will have an unnatural appearance. It has been found that stretching the contrast by up to about 5000:1 can be performed on a wide variety of images without introducing unacceptable artifacts. This threshold is conservative: for many images much larger scale factors produce outstanding results. However, above this threshold, some images may suffer from degradations in visual quality.

$\beta$ may be set with reference to the white level of a display on which an image will be displayed. For example, $\beta$ may be chosen so that saturated pixel values in linearized image data 23 are mapped to an intensity value corresponding to a white point. The white point may, for example, be in excess of 1000 cd/m². In a prototype embodiment, the white point was chosen to be about 1200 cd/m². Values of $\alpha$ and $\beta$ may be chosen to suit any target display. The values for $\alpha$ and $\beta$ may be set independently of any characteristics of the image represented by linearized image data 23.

In optional block 40 an image filter is applied to linearized image data 23 to provide filtered/stretched image data 41. The filtering in block 26 may reduce noise and quantization artifacts. The contrast stretching and non-linear mapping of pixel values can amplify quantization artifacts and noise. LDR input images are usually quantized to 256 pixel values, while over 1000 different values are required to cover the dynamic range of HDR displays at the precision of Just Noticeable Difference (JND) steps. Lossy video compression can further reduce the number of available intensity levels in a local image region.

In some embodiments, block 40 comprises applying a bilateral filter to stretched image data 31. A suitable bilateral filter is described in Tomasi and Manduchi 1998. *Bilateral filtering for gray and color images*. In Proc. of ICCV '98, 839. In general, a bilateral filter has the form:

$$h(x) = A(x) \int_{\xi \in N(x)} f(\xi) c(\xi-x) s(f(\xi)-f(x)) d\xi \quad (2)$$

where $h(x)$ is the output of the filter for the pixel at location x; $A(x)$ is a normalization factor, $f(x)$ is the pixel value at location x; $c(\xi-x)$ is a weighting function that drops off with the distance between the pixel at location $\xi$ and the pixel at location x (c may be called a 'closeness' function); and $s(f(\xi)-f(x))$ is a weighting function that drops off with the difference between $f(x)$ and $f(\xi)$ (s may be called a 'similarity' function). The integral is evaluated over a neighbourhood $N(x)$ of the location x.

Where the bilateral filter is given by Equation (2), the normalization function $A(x)$ may be given by:

$$A(x) = \frac{1}{\int_{\xi \in N(x)} c(\xi-x) s(f(\xi)-f(x)) d\xi} \quad (3)$$

In some embodiments, c and s are Gaussian functions of their respective arguments. For example, c may be given by:

$$c(\xi-x) = e^{-\frac{1}{2}\left(\frac{d(\xi-x)}{\sigma_d}\right)} \quad (4)$$

where $d(\xi-x)$ is the Euclidean distance between $\xi$ and x and $\sigma_d$ is a parameter defining the variance (i.e. how quickly c falls off with increasing distance between $\xi$ and x). The similarity function s may be given by:

$$s(f(\xi)-f(x)) = e^{-\frac{1}{2}\left(\frac{\delta(f(\xi)-f(x))}{\sigma_r}\right)} \quad (5)$$

where $\delta$ is a suitable measure of the distance in intensity space between the pixel values at locations $\xi$ and x and $\sigma_r$ is a parameter defining the variance (i.e. how quickly s falls off with increasing difference between $f(\xi)$ and $f(x)$).

In some embodiments a modified function is used for s such that the variance of s increases with the value of $f(x)$. It is desirable to stretch the variance of the photometric term s in direct proportion to the stretch introduced by the non-linear intensity mapping for the local pixel value in block 30, such that the photometric variance $\sigma_r$ is equal to a fixed number, preferably two, of quantization levels.

The effect of making $\sigma_r$ vary with $f(x)$ as described above is similar to performing a bilateral filter with fixed variance prior to block 30. However, performing the bilateral filter after block 30 can be advantageous because after block 30 the bilateral filter may be performed in fixed point arithmetic. Since performing bilateral filtering can be computationally expensive, where computational resources are limited, it is desirable to operate the bilateral filter on relatively small neighbourhoods $N(x)$ of each pixel. For example, the bilateral filter may be performed on neighbourhoods that include only pixels within four or so pixel spaces of the current pixel.

In a low dynamic range representation of an image, it is typical that pixels in the brightest regions of the image are clipped (e.g. where pixel values in an LDR image are integers in the range of 0 to 255, the pixels in the brightest areas of the image may have pixel values clipped at 255). Since 255 is the maximum possible pixel value, the LDR image lacks information regarding how much brighter the original scene was than the minimum threshold for producing a pixel value of 255. In enhancing the dynamic range of an image it is desirable to boost values of clipped pixels over and above the contrast stretching performed in block 30.

In addition, to obtain the best high-dynamic range image based upon an LDR image it can be desirable to boost values of the brightest pixels even when those pixel values are not clipped. For example, it can be desirable to boost values for pixels having values at or in excess of a white level of the LDR image. In these regions, information may have been lost because the scene intensity exceeded the capabilities of the camera, recording medium, or image data format.

Block 50 generates and applies to filtered image data 41 (or to stretched image data 31 if no filtering is provided between blocks 30 and 50) a brightness enhancement function. An output image 51 is generated as a result of applying the brightness enhancement function. The brightness enhancement function increases the luminance of output image 51 especially in regions where pixel values for at least one color channel exceed a threshold in filtered image data 41. Such regions are described as 'enhancement regions' herein.

The brightness enhancement function attempts to modify the filtered image data 41 to provide an output image 51 that will provide a visceral response in the viewer approximating that associated with viewing the original scene. This is possible even though it is not possible to exactly replace the information that was lost in generating image data 21.

Figure 2:
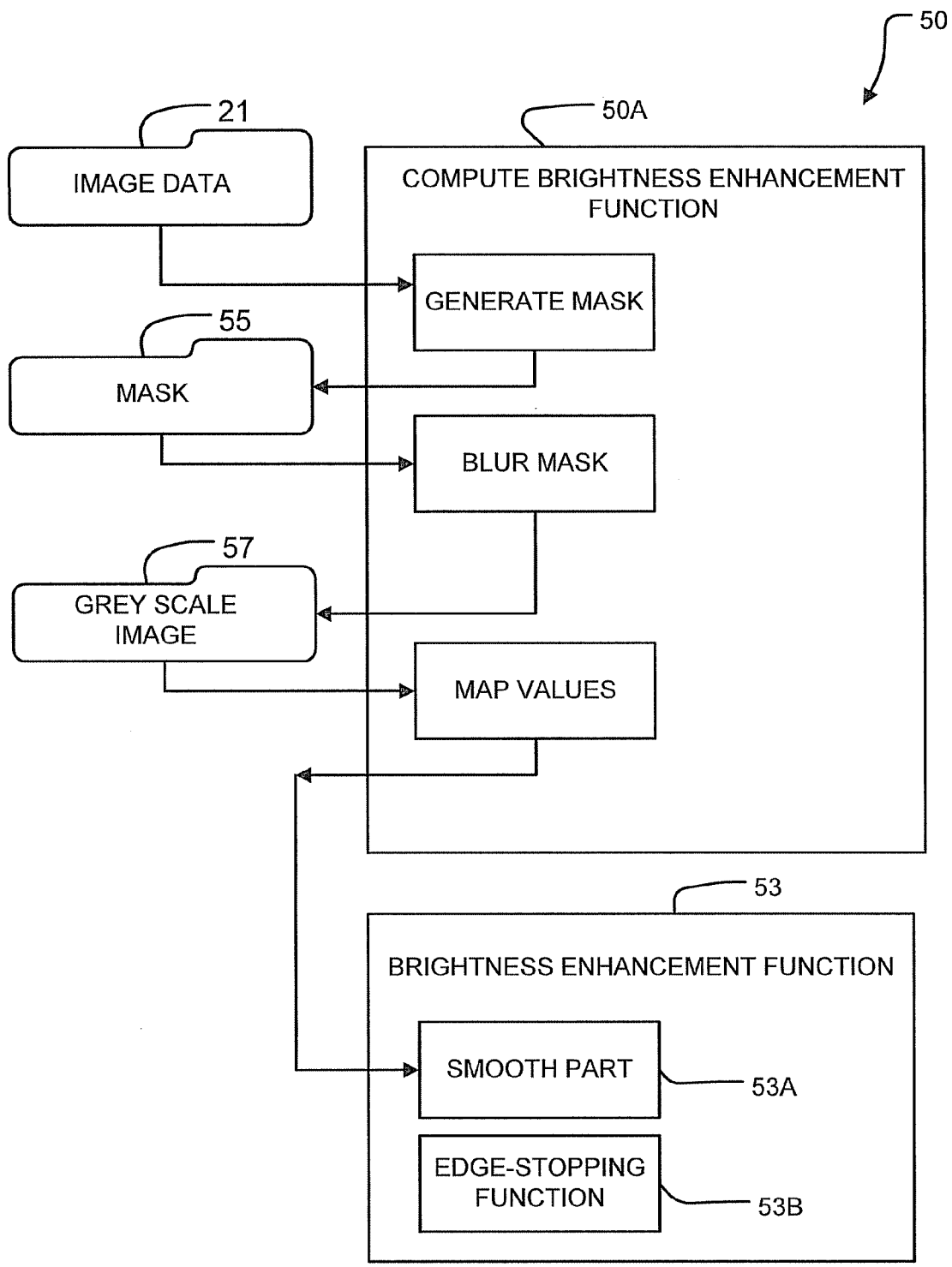
FIG. 2 is a flow chart which illustrates an example method for generating and applying a brightness enhancement function to image data.

As shown in FIG. 2, block 50 may comprise computing in block 50A a function 53 that can be applied to filtered image data 41 to form output image data 51. As described below, brightness enhancement function 53 should have the characteristic that it avoids introducing noticeable spatial or temporal artifacts that would significantly degrade output image data 51. The fidelity required in output image data 51 will vary depending upon its application. In the following example, brightness enhancement function 53 generates values that are used to multiply pixel values in filtered image data 41 to produce output image data 51.

Brightness enhancement function 53 is primarily smoothly varying and has an influence that extends past edges of any enhancement regions in filtered image data 41. The result is an increase in brightness not just for pixels with color channels which exceed the threshold value (or other luminance measure which satisfies a criterion for inclusion in an enhancement region), but for a region surrounding such pixels. As described below, brightness enhancement function 53 may contain sharp edges in areas of strong image gradients in filtered image data 41. In some embodiments, brightness enhancement function 53 is generated by combining a smoothly-varying function 53A and an edge-stopping function 53B that identifies locations of sharp gradients in filtered image data 41.

The smooth brightness enhancement function 53A may be computed based upon a map that identifies pixels in filtered data 41 having values that exceed the threshold value. It is convenient to create a binary mask 55 in which pixels where at least one color channel exceeds the threshold intensity value (or pixels for which some other luminance measure satisfies a criterion for inclusion in an enhancement region) have one value (for example "1") and all other pixels have another value (for example "0"). Where the image data is in a representation which provides a single luminance value, or equivalent, then the binary mask 55 may be made by setting pixels for which the luminance exceeds a threshold value to one value and other pixels to another value.

In general, it is desirable to set the threshold value to be somewhat lower than the clipping value (i.e. the greatest value permitted in image data 21). Video formats typically use a white level of 235, meaning that full white of reflective objects corresponds to a pixel value of 235 in each color channel. Typical video streams also contain larger, 'super-saturated' pixel values corresponding to specular highlights or light sources. Lossy video compression can alter pixel values by a few steps either way. It has been found that when treating image data 21 in an RGB format with each color channel having pixel values in the range of 0 to 255, using a threshold value of 230 works well for separating enhancement regions from other regions in the presence of lossy video compression. It is desirable that the threshold be equal to or lower than the white point of the image in question. For typical photographs, it has been found that a threshold of 254 is adequate in the presence of artifacts introduced by lossy compression.

The methods described herein are not very sensitive to the particular threshold chosen to distinguish between pixels that are merely bright or saturated and those that should be boosted in the HDR image. The threshold value may be varied somewhat without detracting significantly from the appearance of the output image. It is not mandatory to apply a sharp or fixed threshold.

Where pixel values are specified in an RGB or similar format in which luminance information is specified separately for a plurality of color channels, it is convenient and practical but not mandatory that the same threshold be applied for each color channel. Acceptable results could be obtained by applying one threshold (for example 229) to one color channel and another threshold (for example 231) to one or more other color channels.

A smooth brightness enhancement function may be generated from a mask 55 by blurring the mask with a large kernel of Gaussian or approximately Gaussian shape. The result is a grey-scale image 57 having a value for each pixel. The values are largest in their regions which correspond to central portions of enhancement regions in filtered image data 41 and the values fall off smoothly in moving away from such regions. The values in image 57 can then be mapped into a range of 1 to $\alpha$, where $\alpha$ is a multiplication factor to yield a smoothly-varying brightness enhancement function 53A. The mapping of the values of image 57 to the range 1 to $\alpha$ may be linear.

The blur kernel used to generate grey scale image 57 is advantageously large enough that, under expected viewing conditions, the spatial spectrum of the blur filter used to blur mask 55 contains primarily angular frequencies small enough that they do not stand out to the human visual system. For example, the angular frequencies may be 1 cycle per degree or less, preferably 0.5 cycles per degree or less. The human visual system is not very sensitive to changes in brightness that occur at such low spatial frequencies.

The standard deviation of the blur filter in terms of spacing between pixels will depend upon the display dimensions and anticipated range of viewing distances. For example, on a 37 inch (diagonal) display with a resolution of 1920×1080 pixels, a prototype embodiment applies blur filter having a standard deviation of 150 pixels. This corresponds to 1.2 degrees at a viewing distance of 3 m. The standard deviation of the blur filter preferably corresponds to at least ¾ degree, preferably at least one degree, more preferably at least 1.1 degree. As a result, the spatial spectrum of the blur filter will contain primarily low angular frequencies and will not contain high angular frequencies that could result in visually disturbing artifacts.

Most computer monitors are intended to be viewed at a distance of approximately ½ meter. Such a monitor having a width of 30 cm spans a viewing angle of approximately 30 degrees. The recommended viewing angle for television screens in home theatre systems is also typically in the range of 30 to 36 degrees. Where the intended viewing angle is 30 degrees, a standard deviation equal to 1/40 of the horizontal resolution of the display will span about ¾ degrees and a standard deviation equal to 1/20 of the horizontal resolution of the display will span about 1½ degrees.

Where the methods described above are being applied to generate an image to be displayed on a television then it is desirable that the standard deviation of the blur filter be at least about 1/40 of the horizontal resolution of the display and more advantageously at least about 1/30 (where 'about' means ±15%) of the horizontal resolution of the display. For example, for a display having a horizontal resolution of 1920 pixels the standard deviation of the blur filter is advantageously at least about 50 pixels, and more advantageously at least about 65 pixels. As noted above, good results on a display of this horizontal resolution have been achieved with a standard deviation of 150 pixels.

The value of the brightness amplification factor α may be chosen based on the capabilities of the target display. α should not be so large that it generates output values that are significantly greater than the outputs of which the display is capable. In a prototype embodiment, a value of α=4 corresponding to a peak intensity of 4×1200=4800 cd/m² was found to produce good results on a Brightside™ model DR37 display. Due to the large blur radius, the peak intensity is only reached in large enhancement regions. Higher or lower values of α may also be used. For some images, values of α of up to 32 or so may be applied without introducing significant artifacts. Where the method will be applied to a wide range of images without adjustment, a more conservative value of α, such as a value in the range of 2 to 9 or 10 is preferable.

The smooth component 53A of the brightness enhancement function, applied to filtered image data 41 by itself stretches the global contrast, and yields images that appear more crisp than the stretched contrast images when viewed on an HDR display. However, smooth component 53A does not enhance local contrast around sharp edges. To further improve appearance under such conditions, an edge-stopping function 53B can be provided. Edge stopping function 53B limits the influence of smooth component 53A of the brightness enhancement function to those image regions that are not separated from an enhancement area by strong edges.

An edge stopping function 53A may comprise a binary mask that has pixel values indicating whether or not smooth component 53A of the brightness enhancement function should be applied to each pixel. The edge stopping function 53B and smooth component 53A may be combined by identifying those pixels of the smooth component that correspond to pixels of edge stopping function 53B having values that indicate that the smooth component of the brightness enhancement function should not be applied. The values for the identified pixels in smooth component 53A can be set to 1 (so that they do not affect the corresponding values in filtered image 41).

Figure 2A:
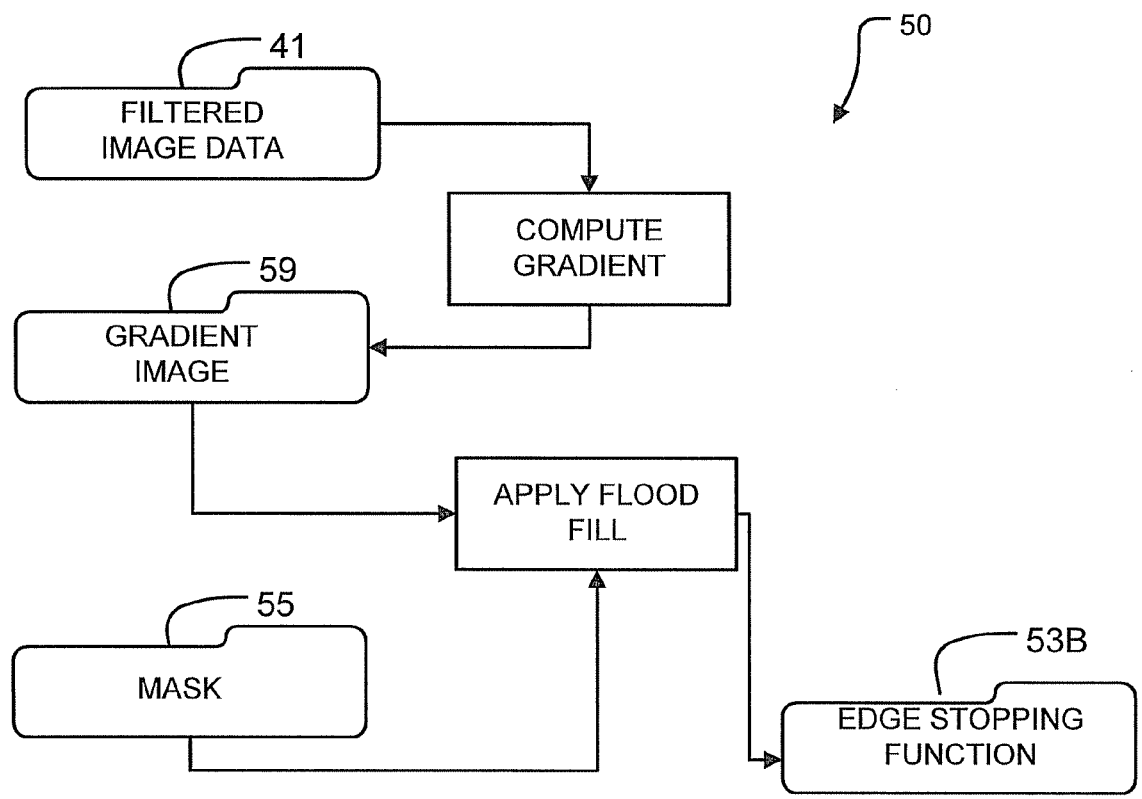
FIG. 2A is a flow chart which illustrates an example method for generating a mask constituting an edge-stopping function.

A mask constituting edge-stopping function 53B may be generated as shown in FIG. 2A based upon mask 55 and a gradient image 59 which may be generated from filtered image data 41. Gradient image 59 may be in the form of a binary mask having pixel values indicating whether or not the gradient at each pixel of filtered data 41 exceeds a threshold value.

Edge stopping function 53B may then be generated by applying a flood fill algorithm using binary mask 55 as a seed and allowing the flood fill to proceed outward from the enhancement regions only until the flood fill reaches pixels in gradient image 59 corresponding to pixels with a large gradient magnitude, or the boundary of the area of influence for smooth brightness enhancement component 53A.

Figure 2B:
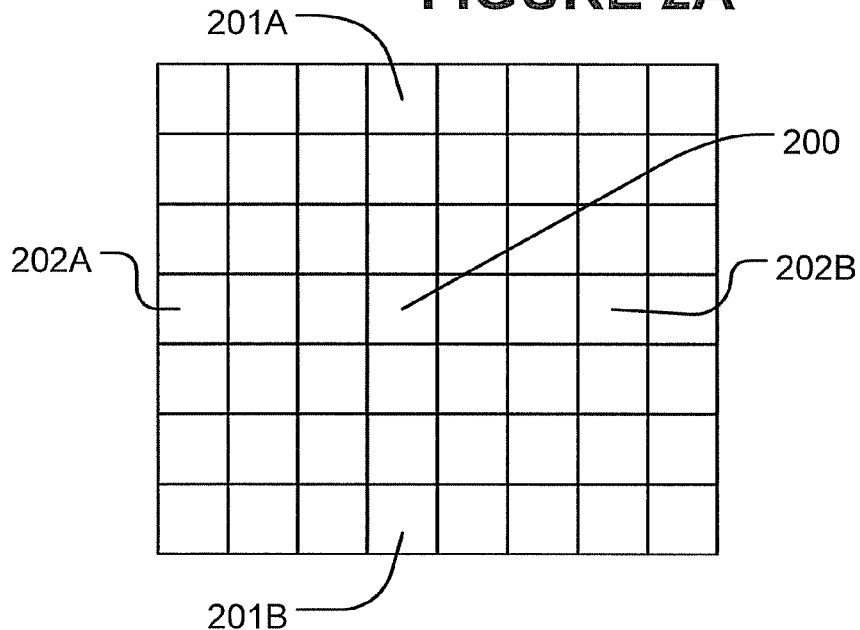
FIG. 2B is a diagram illustrating a neighbourhood of a pixel illustrating one method for determining a gradient at the pixel.

Gradients may be computed for gradient image 59 using the method of divided differences. For example, the gradient at pixel 200 in FIG. 2B may be determined by computing differences between vertically neighbouring pixels 201A and 201B and horizontally neighbouring pixels 202A and 202B. In an example embodiment, the gradient is calculated according to:

$$G=|A-B|^2+|C-D|^2 \quad (6)$$

Where G is the gradient, A is the pixel value of pixel 201A, B is the pixel value of pixel 201B, C is the pixel value of pixel 202A and D is the pixel value of pixel 202B. For robustness it is desirable to use a wide baseline of a few pixels (i.e. 201A and 201B are a few pixels apart and 202A and 202B are a few pixels apart). In the embodiment illustrated in FIG. 2B the baseline is 5 pixels. This has been found to help provide thick edges in the gradient image 59 that reliably prevent the flood fill algorithm from leaking across the edges.

It is desirable to clean up the edge stopping function with a morphological 'OPEN' operator (usually symbolized by 'o') and to slightly blur the result to suppress aliasing. The OPEN operator smooths contours and breaks narrow isthmuses. The OPEN operator may operate by eroding all edges by one pixel and then adding pixels adjacent to any edges in the resulting image. The cleaned up edge stopping function 53B can then be combined with the smooth component 53A of the brightness enhancement function. The resulting brightness enhancement function can then be multiplied onto filtered image data 41 to yield output image data 51.

Figure 3A:
FIGS. 3A, 3B, 3C and 3D respectively show: an example LDR input image, a corresponding smooth component, corresponding brightness enhancement function 53 that has been modified by an edge stopping component, and a HDR output image. Of course, the medium of a patent drawing does not reproduce the dynamic ranges of the input and output images.
Figure 3B:
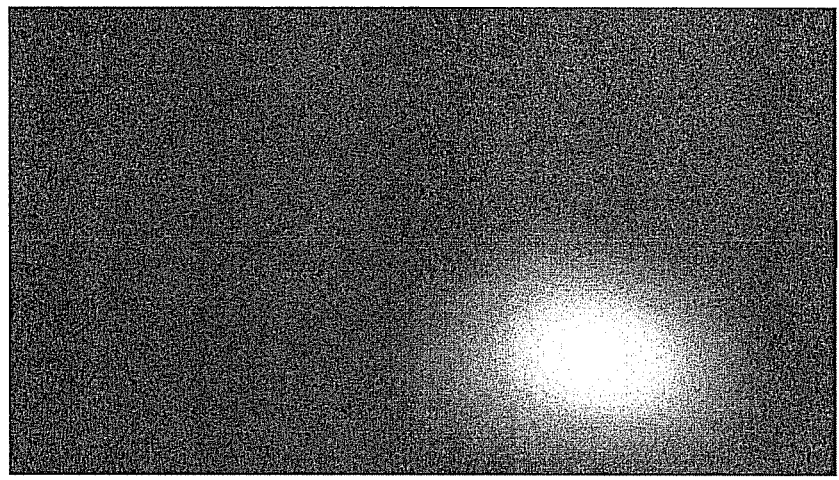
Figure 3C:
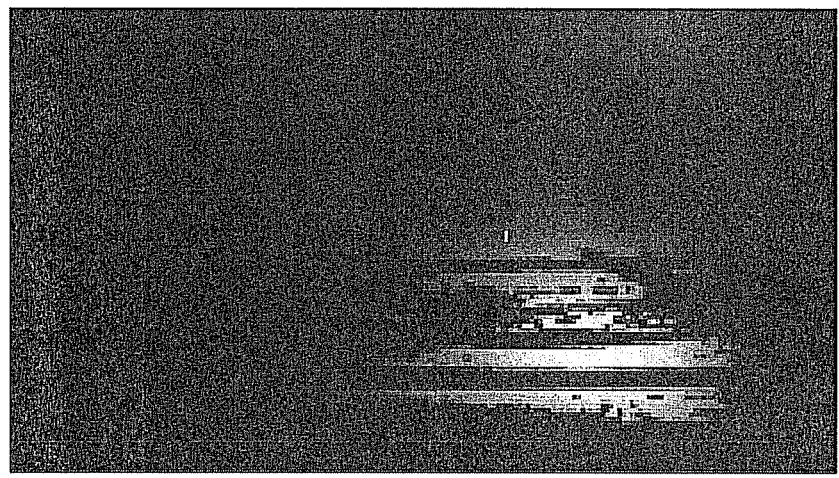
Figure 3D:
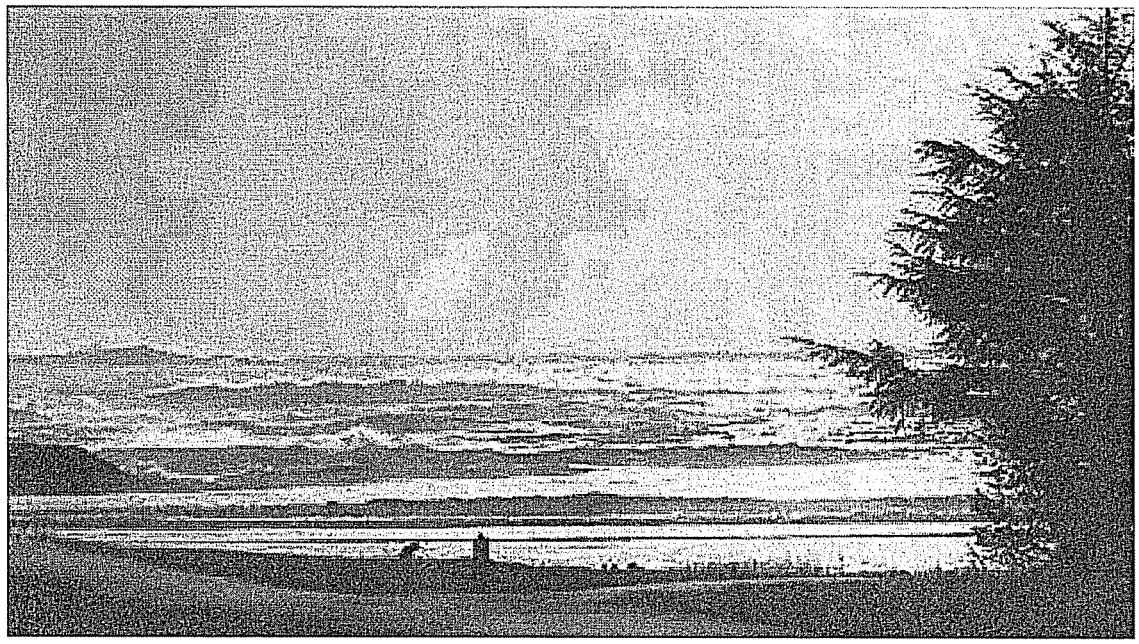

FIGS. 3A, 3B and 3C respectively show: an example LDR input image 60; a corresponding smooth component 53A; and a corresponding brightness enhancement function 53 that has been modified by an edge stopping component.

Figure 4A:
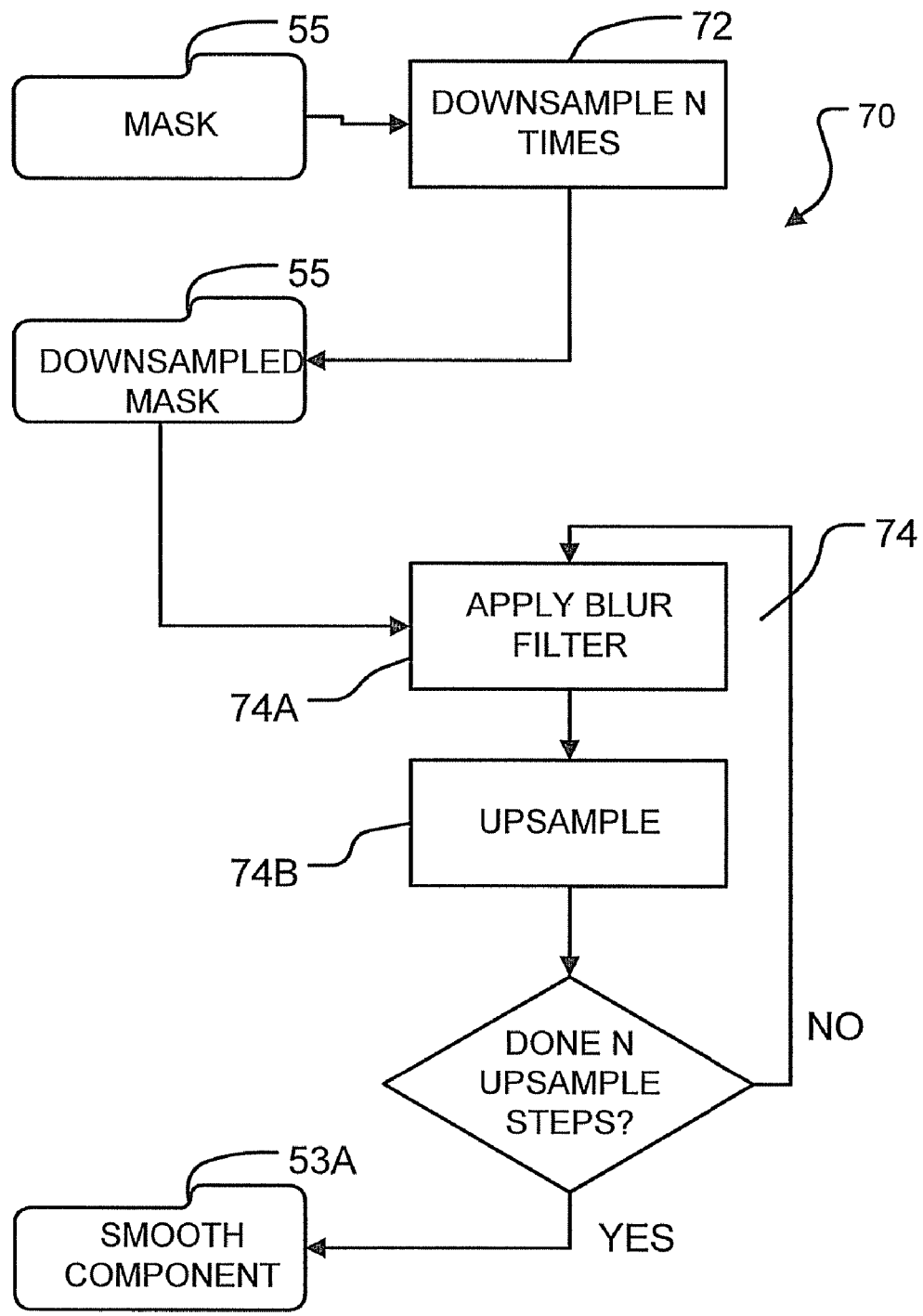
FIG. 4A is a sample method for generating a smooth component for a brightness enhancement function.
Figure 4B:
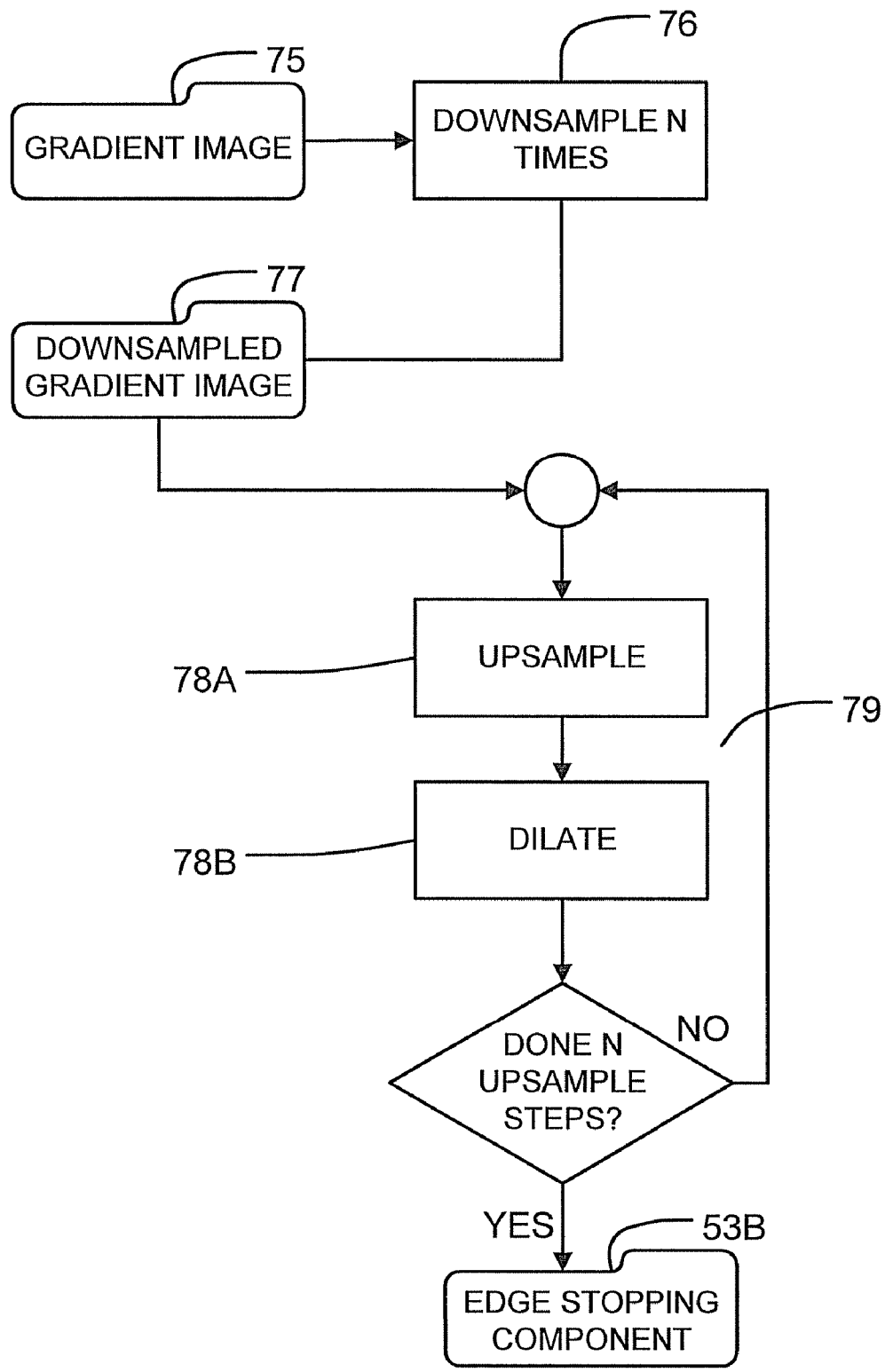
FIG. 4B is a method for generating an edge stopping component for a brightness enhancement function.

One computationally-efficient way to generate smooth component 53A and edge-stopping component 53B involves down-sampling and up-sampling image data as shown in FIGS. 4A and 4B. Smooth component 53A is generated by method 70. In block 72, mask 55 is down-sampled N times to obtain a down-sampled mask 73. Each downsampling step may reduce the number of pixels by a suitable factor in each dimension. It is convenient to downsample in such a way that the number of pixels in each dimension is reduced by a factor of two (the number of pixels is reduced by a factor of four) in each downsampling step.

Smooth component 53A is then obtained from down-sampled mask 73 in loop 74 by applying N times a blur filter (block 74A) (which may be a Gaussian blur having a small kernel—e.g. a Gaussian blur applied to a 3×3 pixel neighbourhood of each pixel) and then up-sampling the result with nearest-neighbour interpolation (block 74B). This technique may be described as an image pyramid technique. The use of image pyramids is described in Burt P. and Adelson E., 1983, *The Laplacian pyramid as a compact image code*, IEEE Trans. on Communication 31, 4, 532-540.

Edge stopping component 53B is generated as shown in FIG. 4B by starting with a gradient image 75 representing the gradient of filtered image 41. In block 76, gradient image 75 is down-sampled N times to yield a down-sampled gradient image 77. Edge stopping function 53B is then obtained from down-sampled mask 73 in loop 79 by N times, upsampling the downsampled mask using nearest-neighbour interpolation (block 78A) and applying a morphological 'DILATION' operation to the result (block 78B). The DILATION operation (usually symbolized by '⊕') is performed on small (e.g. 3×3 pixel) blocks (i.e. using a 3×3 square structuring element) and is modified to stop at pixels that correspond to an edge (e.g. are marked as having a high gradient in the edge image of the corresponding resolution).

Advantageously the radius (block size) on which the DILATION operator works in block 78B is the same as the radius on which the blur operation is performed in block 74A. This causes the boundaries of the regions affected by the blur and dilation operators to propagate outwardly at the same speed over sequential upsampling steps.

Figure 4C:
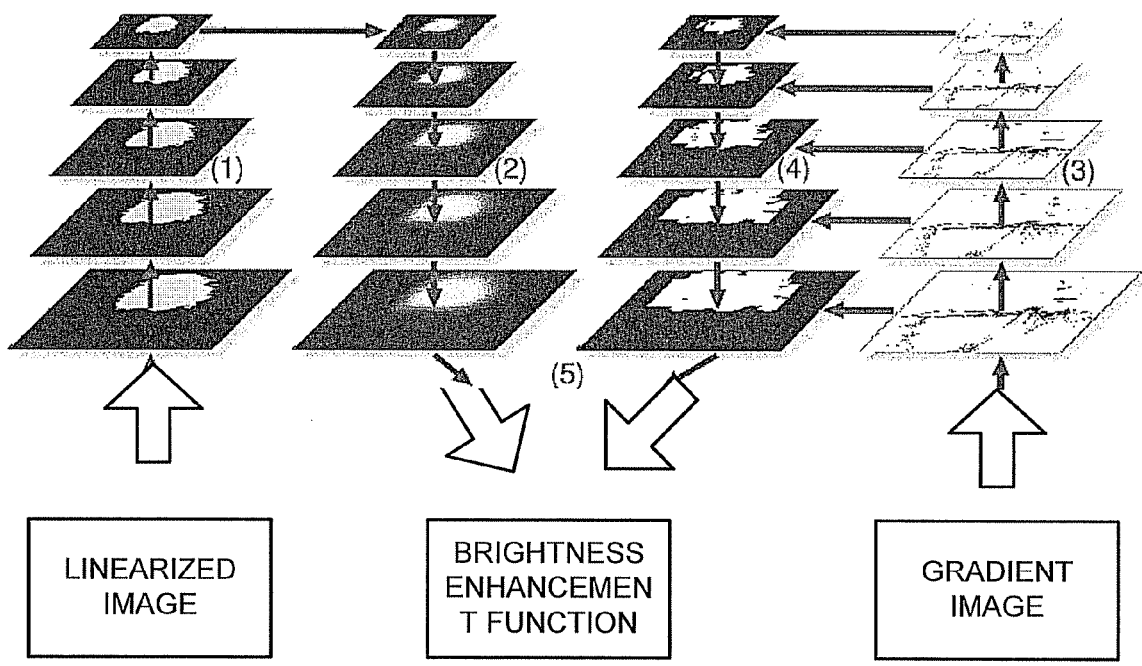
FIG. 4C illustrates image pyramids that may be used in the generation of a brightness enhancement function by the method of FIG. 4A, for example.

FIG. 4C shows downsampled images and gradient images providing image pyramids that may be applied in the methods of FIGS. 4A and 4B.

The example methods described herein may be implemented in a manner that provides advantageous characteristics which may include one or more of the following:

- The methods may be implemented as algorithms for execution by graphical processor units ('GPUs');
- The methods may be implemented as algorithms which may be executed by signal processors, application-specific integrated circuits (ASICs) or field programmable gate arrays ('FPGAs'), which may be located in displays, media players or the like.
- The methods are efficient enough to be performed in real-time on dynamic HDTV resolution video streams.
- User input is not required. All parameters can be chosen in advance based on hardware characteristics of the display on which the images will be displayed.
- The methods can be robust in the sense that they avoid producing disturbing artifacts. The visual quality of the HDR output image can be at least as good as that of the input image for a very large range of content.
- The output video stream can be temporally coherent (so that colors and intensities do not change abruptly unless they do so in the input image).

Figure 5:
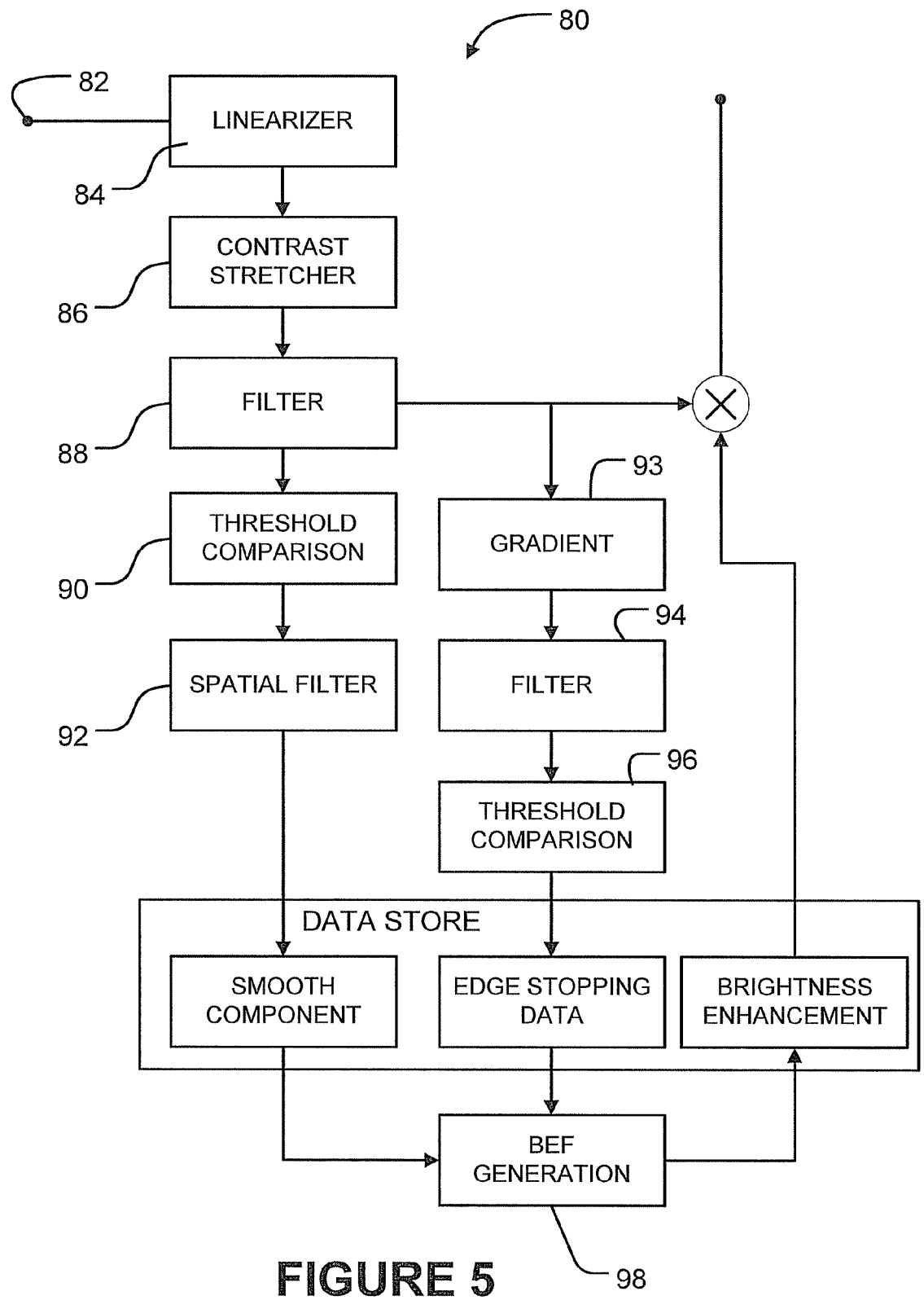
FIG. 5 illustrates apparatus according to an embodiment of the invention.

FIG. 5 shows apparatus 80 according to an embodiment of the invention. Apparatus 80 comprises an input 82 which receives image data. The image data is passed in series through a linearizer 84, a contrast stretcher 86 and a filter 88. The output of filter 88 is passed to a threshold comparison system 90 and a spatial filter 92 to produce data defining a smooth component of a brightness enhancement function. The output of filter 88 is also passed in sequence through a gradient computer 93, a filter 94 and a threshold comparison system 96 to yield edge stopping data. The data defining the smooth component of the edge stopping function and the edge stopping data are provided to a component 98 that generates a brightness enhancement function. The brightness enhancement function and the output of filter 88 are applied to multiplier 99. The resulting output data is carried to an output, stored in a data store or in the alternative, continues into a data path of a display which displays the output data. Apparatus 80 may process data received at input 82 in real time.

The elements illustrated in FIG. 5 may be implemented in any suitable manner. For example, these elements may comprise software executing on suitable data processors, fixed hardware circuits, configurable hardware, such as FPGAs or portions thereof configured to perform the required functions or the like.

Some high dynamic range displays are of a type that have two modulators. A first modulator produces a light pattern and a second modulator modulates the light pattern produced by the first modulator to yield an image. The first modulator is driven to produce a comparatively low-resolution representation of an image. The low-resolution representation is modulated by the second modulator to provide a higher resolution image which can be viewed by an observer. The first modulator may comprise a matrix or array of actively modulated light sources, such as light emitting diodes (LEDs) or the like or, in the alternative, a modulator that modulates light emitted by a light source that is functionally separate from the modulator. The first modulator may be described as a light-emitting layer as it emits light. The amount of light emitted as a function of location on the light-emitting layer may be controlled. The second modulator is a liquid crystal display (LCD) in some embodiments. Such displays generate separate driving signals for the first and second modulators.

Some ways to generate driving signals for first and second modulators in dual modulator displays are described in international application No. PCT/CA2005/000807 filed on 27 May 2005 and entitled RAPID IMAGE RENDERING ON DUAL-MODULATOR DISPLAYS. This application was published as WO 2006/010244 and is hereby incorporated by reference herein.

There is a synergy between the methods described above for enhancing dynamic range and the methods which may be applied to generate driving signals for the modulators in a dual modulator display. In particular, certain intermediate results are useful for both methods. In some embodiments the methods and apparatus described herein for enhancing dynamic range are combined with methods and apparatus for generating driving signals for a dual modulator display. Advantageously, data is shared between the methods. This conserves hardware and/or computing resources. A particular saving results in some embodiments wherein certain down-sampled image data is used both for the purposes of enhancing dynamic range of an image and for generating appropriate driving signals to cause a display to display the enhanced image. In some embodiments, apparatus according to the invention is incorporated into a video processor chip for use in a display or a display driver chip for use in a display.

Figure 6:
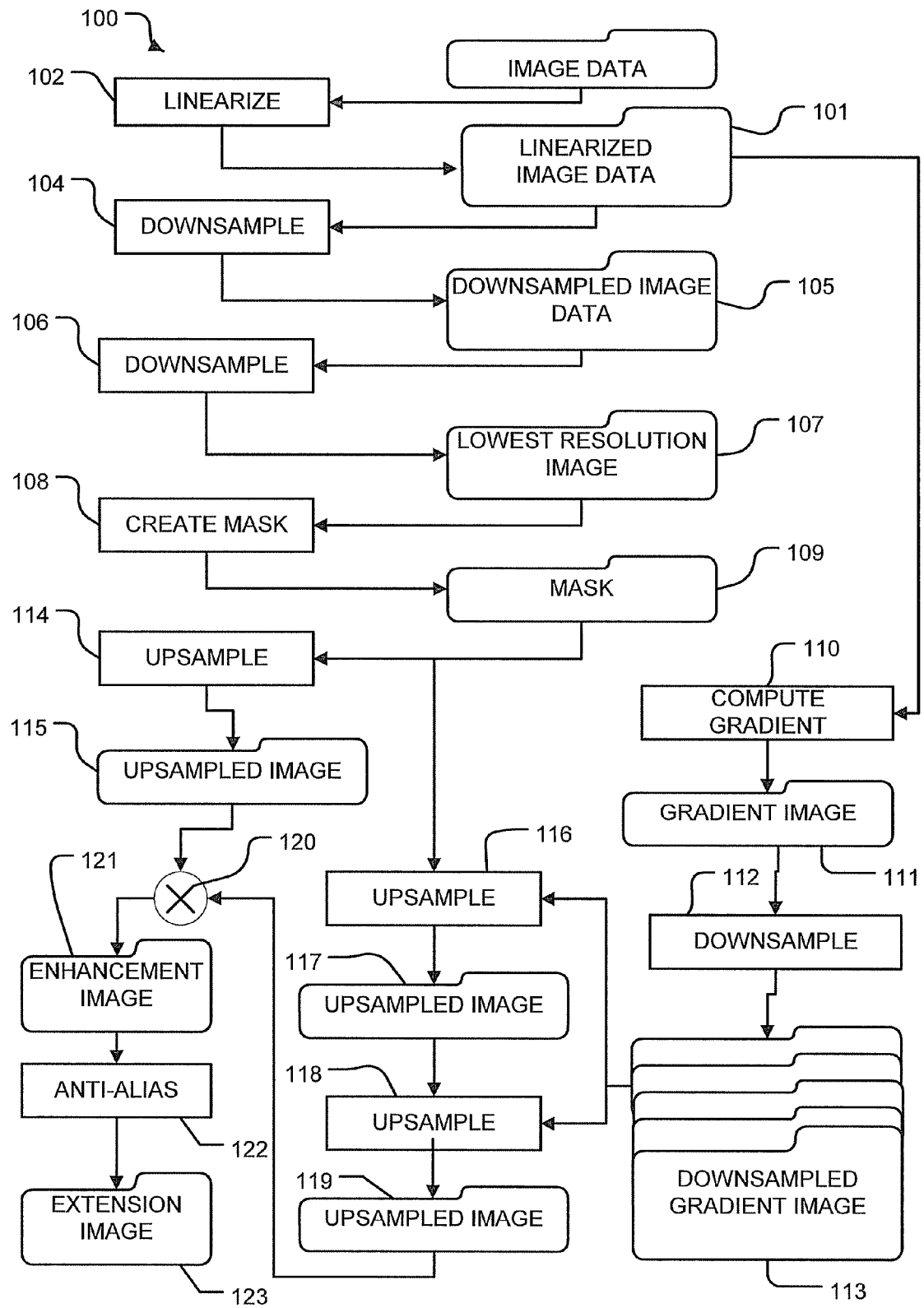
FIGS. 6 and 6A illustrate a method for enhancing dynamic range of image data and generating driving values for modulators of a dual modulator type display to display the image data.
Figure 6A:
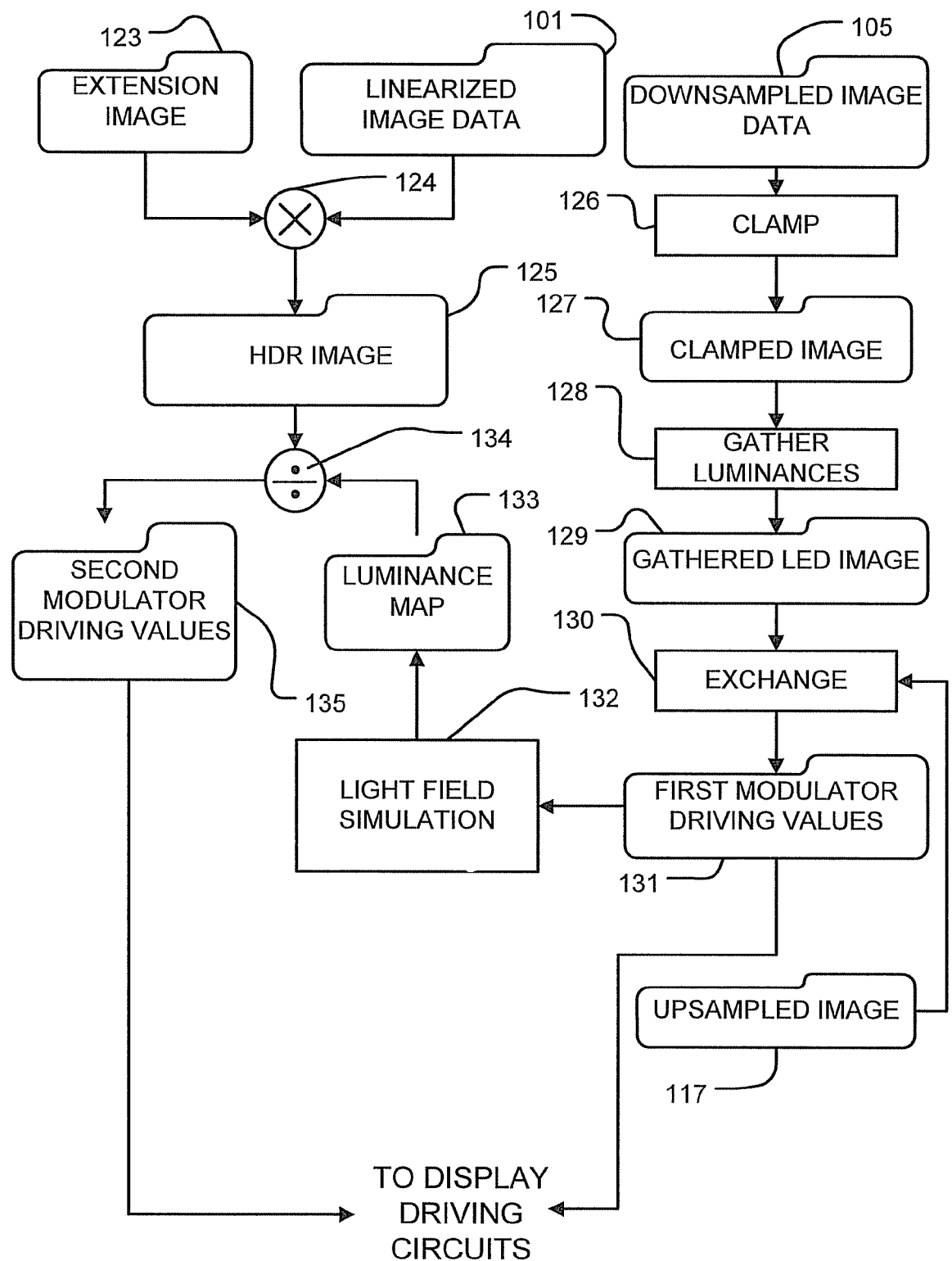

FIGS. 6 and 6A illustrate a method 100 for enhancing and displaying an image according to an example embodiment. This method may be carried out in circuitry of the display. In block 102 an initial lower-dynamic-range image is linearized in intensity space to provide a linearized image 101. As described above, where the initial image has been encoded with a gamma curve, block 102 may comprise Gamma correcting the luminance values.

In block 104, linearized image 101 is downsampled to a resolution matching that of the elements of a light source layer of the display that is to be used to display the image. The downsampling produces downsampled image 105. Downsampling may be performed in one or more stages. The light source layer may comprise, for example a matrix of light sources such as light-emitting diodes (LEDs), an array of controllable pixels in a reflection-type or transmission-type modulator that regulates the transmission of light from a common light source or set of light sources, or the like. The resolution of downsampled image 105 is typically greater than that of the lowest-resolution image that is used as the down-sampled gradient image 77 (See FIG. 4B) or 107 for the purpose of dynamic range enhancement.

Downsampled image 105 is preserved and in block 106 downsampled image 105 is further downsampled to the lowest resolution desired for generating a brightness enhancement function. The further downsampling yields lowest-resolution image 107. The further downsampling may be performed in a series of downsampling steps.

A mask 109 identifying enhancement regions is prepared in block 108. Block 108 may comprise comparing pixel values in lowest-resolution image 107 to one or more threshold values, as described above, for example.

In block 110 a gradient image 111 is computed from linearized image 101. The gradient image may be computed in the manner described above. In block 112 gradient image 111 is downsampled to the same resolution as lowest-resolution image 107 and mask 109. The downsampling is performed in a series of downsampling steps. This downsampling yields a set of downsampled gradient images 113 of different resolutions.

In block 114, mask 109 is upsampled a number of times to reach the resolution of linearized image 101. A Gaussian blur is applied before each upsampling step. The upsampled image is a greyscale image 115.

In block 116, mask 109 is upsampled to the same resolution as downsampled image 105. The result is preserved as upsampled image 117. At each upsampling step, the gradient image 113 of the corresponding resolution is used as an edge stop (pixels corresponding to high-gradient pixels in the corresponding gradient image 113 are set to a value that will result in the brightness enhancement function affecting those pixels to a lesser degree or not at all).

In block 118 upsampled image 117 is further upsampled to the resolution of linearized image 101. The result of the upsampling is image 119. Again, at each upsampling step, the gradient image 113 of the corresponding resolution is used as an edge stop.

In block 120, greyscale image 115 is multiplied with image 119 to yield enhancement image 121. In block 122 an anti alias filter is applied to image 121 or image 121 is antialiased in another suitable way to yield a saturation extension image 123.

In block 124 saturation extension image 123 is multiplied with linearized image 101 to yield a HDR image 125.

A control signal 131 for a light-emitting layer (first modulator) is generated in blocks 126 through 130. In block 126 the luminance of downsampled image 105 is clamped so that the luminance does not exceed a threshold value (e.g. the threshold value could be related to a maximum luminance that a LED is capable of emitting). Block 126 yields clamped image 127.

In block 128 a luminance gathering step is performed on clamped image 127 to yield gathered LED image 129. Block 128 may comprise applying a blur filter to clamped image 127. Block 128 is useful in the case where light source elements of the first modulator are laid out in a pattern that is different from a grid used in image processing. For example, LEDs or other light sources of a first modulator in a display device may be arranged in a hexagonal grid but the image processing steps of method 100 may be performed on a square or rectangular grid (for the convenience of the image processing algorithm and/or hardware). In such a case, some square grid elements may not correspond to a LED or other light-emitting element of the first modulator. In block 128, a blur is performed to spread the intensity to neighboring elements that do correspond to LEDs or other light-emitting element of the first modulator.

In block 130, an exchange is performed on gathered LED image 129 to yield first modulator driving values 131. The exchange operation increases the intensity of light delivered by the first modulator to areas of the second modulator that correspond to enhancement regions in upsampled image 117. The intensity of light at a location on the second modulator can be increased by increasing the output of light sources of the first modulator surrounding the light source that corresponds to the location. As discussed below, the pixel values for the second modulator are set based upon a light field simulation. The light field simulation takes into account the light that will be produced when the first modulator is driven by driving values 131. This prevents areas surrounding locations at which the intensity of the light pattern produced by the first modulator has been increased from being unduly bright in the image seen by a viewer.

In block 132 light field simulation is performed on gathered LED image 129 taking into account upsampled image 117 which provides information regarding the dynamic range enhancement to be applied to elements of the light source layer. Block 132 yields a luminance map 133 which estimates the luminance of light incident at the pixels of the second modulator that will result when driving values 131 corresponding to gathered LED image 129 as modified by upsampled image 117 are applied to drive the light source layer (first modulator).

In block 134 HDR image 113 is divided by luminance map 133 to yield driving values 135 for the elements of the second modulator. Block 134 may also involve adjusting the image values for the response function (gamma) of the second modulator.

The display will display a rendering of HDR image 113 when the first modulator is driven according to driving values 131 and the second modulator is driven according to driving values 135.

In some embodiments, driving values 131 are sent downstream to display driving circuitry in a 'spare' scanline of an image format containing driving values 135. The driving circuitry extracts driving values 131 from the spare scanline and applies those values to driving the first modulator. This is often practical since the first modulator typically has far fewer elements than the second modulator and the data format may have the capacity to carry one or more scan lines not required by the second modulator. For example, a first modulator may be made up of a number of LEDs that is less than a number of pixels on one scan line of the second modulator. In this case, all of the driving values for the LEDs can be contained in a single scan line of the data format that is not needed to carry values for pixels of the second modulator.

A display or a component within a display may be configured to perform the method of FIG. 6 on incoming image data. In some embodiments, the method includes determining whether or not incoming image data requires dynamic range enhancement. If no dynamic range enhancement is required (for example, in a case where the incoming image data defines a high dynamic range image in a suitable HDR data format) then the display switches to a mode in which dynamic range enhancement is turned off. The steps of FIG. 6 may be performed in one or more data processors, such as graphics processors, digital signal processors or microprocessors, for example, and/or by hardware subsystems such as suitably configured ASICS, FPGAs, logic circuits and the like. In some embodiments, the steps of FIG. 6 are performed on frames of a sequence of video frames in real time at a frame rate of the sequence of video frames.

Certain implementations of the invention comprise computer processors which execute software instructions which cause the processors to perform a method of the invention. For example, one or more processors in a display or display controller or media player may implement the methods of FIGS. 1, 1A, 2, 2A, 4A 6 and/or 6A by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

- In the example methods described above, the brightness enhancement function is applied (e.g. in block 50) after contrast has been stretched (e.g. in block 30). This ordering is not mandatory. In alternative embodiments, a brightness enhancement function could be applied prior to applying a general contrast stretching.
- The methods described herein are facilitated by operating in a representation wherein pixel values vary linearly with luminance. This is convenient but not mandatory. The methods described herein could be performed, with appropriate modifications, in a non-linear space.
- In some applications it is practical to provide an option to permit a human user to fine tune one or more parameters affecting the enhancement of dynamic range so as to achieve an HDR image having a desired appearance. Embodiments for such applications may comprise a user interface which provides access to the parameters. A user can then chose desired values for the parameters and view an image created from a source image by the application of methods as described herein which use those parameters. Any parameters may be made user-adjustable. Some examples of parameters that may be user-adjustable are: parameters defining a linearization function; thresholds for identifying enhancement regions; parameters specifying dark and white points; parameters specifying an amount of contrast stretching to be applied globally; parameters relating to the size of the area affected by the brightness enhancement function; parameters related to the maximum value of the brightness enhancement function, and the like.

Accordingly, the scope of the invention is to be construed in accordance with the substance defined by the following claims.

What is claimed is:

1. A method for enhancing dynamic range of a first image, the method comprising:

identifying one or more enhancement regions within the first image for which luminance values satisfy an enhancement criterion;

applying a smoothly-varying brightness enhancement function to the first image to obtain a second image having a dynamic range greater than that of the first image, the brightness enhancement function increasing luminance values of the second image over the first image in the enhancement regions and in at least some areas adjacent to the enhancement regions, the effect of the brightness enhancement function dropping off smoothly with increasing distance from the enhancement regions.

2. A method according to claim 1 comprising generating the brightness enhancement function from the first image, wherein generating the brightness enhancement function comprises: generating a mask based on the first image and blurring the mask.

3. A method according to claim 2 wherein blurring the mask comprises applying a Gaussian blur filter to the mask.

4. A method according to claim 1 wherein applying the brightness enhancement function to the first image comprises, for each pixel in the first image, multiplying a corresponding first image pixel value by a corresponding brightness enhancement factor.

5. A method according to claim 3 wherein the brightness enhancement function has values corresponding to pixels of the image that are in the range of 1 to a where a is in the range of 3 to 12.

6. A method according to claim 2 wherein a spatial spectrum of the brightness enhancement function comprises primarily angular frequencies of 1 cycle per degree or less referenced to an intended viewing location.

7. A method according to claim 2 comprising displaying the second image on a display and wherein a standard deviation of the brightness enhancement function is at least about 0.025 of a horizontal resolution of the display.

8. A method according to claim 1 wherein applying the brightness enhancement function to the first image comprises: identifying one or more high-gradient edges corresponding to the enhancement regions; increasing luminance values of the second image over the first image in the areas adjacent to the enhancement regions and closer to their respective enhancement regions than high-gradient edges; and discontinuing increasing luminance values of the second image over the first image at areas further from their respective enhancement regions than the high-gradient edges.

9. A method according to claim 2 wherein generating the brightness enhancement function comprises generating an edge-stopping component of the brightness enhancement function based at least in part on a gradient image of the first image, the edge-stopping component having pixel values which indicate whether or not application of the brightness enhancement function should increase the luminance of corresponding pixels of the first image.

10. A method according to claim 1 comprising generating the brightness enhancement function, wherein generating the brightness enhancement function comprises:

generating a binarized mask which identifies pixels inside and outside of the one or more enhancement regions;

down-sampling the binarized mask to obtain a down-sampled mask;

for each iteration in a loop comprising N iterations:

applying a blur filter to the down-sampled mask in an initial iteration and to a result of the previous iteration in other iterations; and up-sampling a result of the blur filter by an up-sampling step;

wherein a result of the $N^{th}$ iteration of the loop comprises grey-scale image data having the same resolution as the first image data, the grey-scale image data convertable into at least a portion of the brightness enhancement function by suitable mapping.

11. A method according to claim 10 comprising mapping the grey-scale image data to provide a smooth component of the brightness enhancement function, the smooth component having a range of 1-a, where a is a brightness amplification parameter greater than 1.

12. A method according to claim 10 wherein generating the brightness enhancement function comprises generating an edge-stopping component of the brightness enhancement function based at least in part on a gradient image of the first image, the edge-stopping component having pixel values which indicate whether or not application of the brightness enhancement function should increase the luminance of corresponding pixels of the first image.

13. A method according to claim 12 wherein generating the edge-stopping component comprises:
- down-sampling the gradient image of the first image in a series of N down-sampling steps to obtain a set of N down-sampled gradient images;
- for each iteration in a loop comprising N iterations:
  - performing a DILATION operation to the down-sampled mask in an initial iteration and to a result of the previous iteration in other iterations; and
  - up-sampling a result of the DILATION operation by an up-sampling step.

14. A method according to claim 1 comprising generating the brightness enhancement function, wherein generating the brightness enhancement function comprises:
- down-sampling the first image to obtain intermediate-resolution down-sampled image data;
- further down-sampling the intermediate-resolution down-sampled image data to obtain lower-resolution down-sampled image data;
- generating a lower-resolution mask from the lower-resolution down-sampled image data, the lower-resolution mask identifying pixels inside and outside of the one or more enhancement regions; and
- for each iteration in a loop comprising N iterations:
  - applying a blur filter to the lower-resolution mask in an initial iteration and to a result of the previous iteration in other iterations; and
  - up-sampling a result of the blur filter by an up-sampling step;

wherein a result of the $N^{th}$ iteration of the loop comprises grey-scale image data having the same resolution as the first image, the grey-scale image data convertable into at least a component of the brightness enhancement function.

15. A method according to claim 14 wherein generating the edge-stopping component comprises:
- down-sampling the gradient image of the first image in a series of N down-sampling steps to obtain a set of N down-sampled gradient images;
- for each iteration in a first loop comprising M iterations, where M<N:
  - performing a DILATION operation to the lower-resolution mask in an initial iteration and to a result of the previous iteration in other iterations; and
  - up-sampling a result of the DILATION operation by an up-sampling step;

wherein a result of the first loop comprises intermediate-resolution edge-stopping data;
- for each iteration in a second loop comprising N-M iterations:
  - performing the DILATION operation to the intermediate-resolution edge-stopping data in an initial iteration and to a result of the previous iteration in other iterations; and
  - up-sampling a result of the DILATION operation by an up-sampling step;

wherein a result of the second loop comprises full-resolution edge-stopping data having a resolution corresponding to that of the first image.

16. A method according to claim 14 comprising determining first modulator driving values for a first modulator of a dual modulator display used to display the second image based at least in part on the intermediate-resolution down-sampled image data.

17. A method according to claim 15 comprising determining first modulator driving values for a first modulator of a dual modulator display used to display the second image based at least in part on the intermediate-resolution down-sampled image data and based at least in part on the intermediate-resolution edge-stopping data.

18. A non-transitory computer-readable medium comprising a series of instructions which, when executed by a suitably configured processor, cause the processor to perform the method of claim 1.

19. A method for displaying a first image having a relatively high dynamic range obtained from a second image having relatively low dynamic range, the method comprising:
- identifying at least one enhancement region within the second image;
- applying a brightness enhancement function to the second image to generate the first image, wherein compared to the second image, the first image comprises increased luminance values of enhancement-region pixels in the enhancement region and increased luminance values of one or more boundary-region pixels outside of the enhancement region, the luminance value increase of the boundary-region pixels decreasing with distance from the enhancement region; and
- determining driving signals for at least one modulator of a dual-modulator display based at least in part on intermediate data obtained in the course of application of the brightness enhancement function to the second image.

20. A method according to claim 19 wherein the intermediate data comprises down-sampled data obtained by down-sampling the second image.

* * * * *